(12) United States Patent
Pelchen et al.

(10) Patent No.: US 7,418,327 B2
(45) Date of Patent: Aug. 26, 2008

(54) METHOD FOR DETERMINING A CONTROL STANDARD OF AN ACTIVE VEHICLE STEERING DEVICE CONTROLLABLE BY A CONTROL DEVICE

(75) Inventors: Christoph Pelchen, Tettnang (DE); Andreas Thies, Friedrichshafen (DE); Thomas Rosemeier, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 69 days.

(21) Appl. No.: 11/305,410

(22) Filed: Dec. 16, 2005

(65) Prior Publication Data

US 2006/0173597 A1 Aug. 3, 2006

(51) Int. Cl.
*B62D 6/00* (2006.01)
*B62D 11/00* (2006.01)
*B62D 12/00* (2006.01)
*G06F 19/00* (2006.01)

(52) U.S. Cl. .................. 701/41; 180/6.2; 180/234; 180/443; 280/1.202; 340/426.31; 340/465

(58) Field of Classification Search .................. 701/41; 180/197, 246, 179; 280/1.202; 340/426.31, 340/465
See application file for complete search history.

(56) References Cited

U.S. PATENT DOCUMENTS

| | | | | |
|---|---|---|---|---|
| 5,152,362 A * | 10/1992 | Naito | .................. | 180/248 |
| 5,388,658 A * | 2/1995 | Ando et al. | .................. | 180/197 |
| 5,450,919 A * | 9/1995 | Shitani | .................. | 180/233 |
| 6,155,655 A * | 12/2000 | Matsuno | .................. | 303/140 |
| 6,415,215 B1 * | 7/2002 | Nishizaki et al. | .............. | 701/70 |
| 6,424,907 B1 * | 7/2002 | Rieth et al. | .................. | 701/124 |
| 6,449,542 B1 | 9/2002 | Bottiger et al. | | |
| 6,549,842 B1 * | 4/2003 | Hac et al. | .................. | 701/80 |
| 6,648,426 B1 * | 11/2003 | Boettiger et al. | ............ | 303/146 |
| 6,865,461 B2 | 3/2005 | Neef et al. | | |
| 6,904,351 B1 * | 6/2005 | Hac | .................. | 701/70 |
| 6,954,691 B2 * | 10/2005 | Roll et al. | .................. | 701/70 |
| 7,359,787 B2 * | 4/2008 | Ono et al. | .................. | 701/82 |
| 2002/0056582 A1 * | 5/2002 | Chubb et al. | .............. | 180/197 |
| 2002/0087251 A1 * | 7/2002 | Kogure et al. | .............. | 701/80 |
| 2002/0117347 A1 * | 8/2002 | Nishizaki et al. | ........... | 180/403 |
| 2003/0191572 A1 * | 10/2003 | Roll et al. | .................. | 701/70 |
| 2004/0193345 A1 * | 9/2004 | Chen et al | .................. | 701/42 |
| 2004/0267428 A1 * | 12/2004 | Knoop et al. | .............. | 701/70 |

(Continued)

FOREIGN PATENT DOCUMENTS

DE 197 23 358 A1 12/1998

(Continued)

*Primary Examiner*—Khoi H. Tran
*Assistant Examiner*—Jorge O Peche
(74) *Attorney, Agent, or Firm*—Davis Bujold & Daniels, P.L.L.C.

(57) ABSTRACT

A method for determining a control standard of an active steering device (10) of a vehicle (1) controllable by a control device (11). A driving dynamic of the vehicle (1) is influenced according to the control standard. The control standard is determined according to a nominal yawing rate calculated at least with reference to different actual operating parameters of the vehicle and one dynamic vehicle state determined according to the nominal yawing rate and actual operating state parameters. The control standard is superimposed on a steering transit angle preset by a driver so that an existing actual yawing rate is changed in direction of the nominal yawing rate.

14 Claims, 6 Drawing Sheets

U.S. PATENT DOCUMENTS

| | | | |
|---|---|---|---|
| 2005/0033486 A1* | 2/2005 | Schmitt et al. | 701/1 |
| 2005/0043874 A1* | 2/2005 | Chen et al. | 701/42 |
| 2005/0067213 A1* | 3/2005 | Yasui et al. | 180/443 |
| 2005/0125131 A1* | 6/2005 | Kato et al. | 701/70 |
| 2005/0205346 A1* | 9/2005 | Aizawa et al. | 180/446 |
| 2005/0209751 A1* | 9/2005 | Kato | 701/41 |
| 2005/0236894 A1* | 10/2005 | Lu et al. | 303/139 |
| 2006/0015238 A1* | 1/2006 | Motoyama | 701/71 |
| 2006/0100766 A1* | 5/2006 | Schwarz et al. | 701/71 |
| 2006/0173597 A1* | 8/2006 | Pelchen et al. | 701/41 |
| 2006/0259225 A1* | 11/2006 | Ono et al. | 701/82 |

FOREIGN PATENT DOCUMENTS

| | | |
|---|---|---|
| DE | 198 51 978 A1 | 5/2000 |
| DE | 100 11 779 A1 | 6/2001 |
| DE | 102 12 582 A1 | 9/2003 |
| DE | 103 25 182 A1 | 12/2004 |
| DE | 103 28 979 A1 | 1/2005 |

* cited by examiner

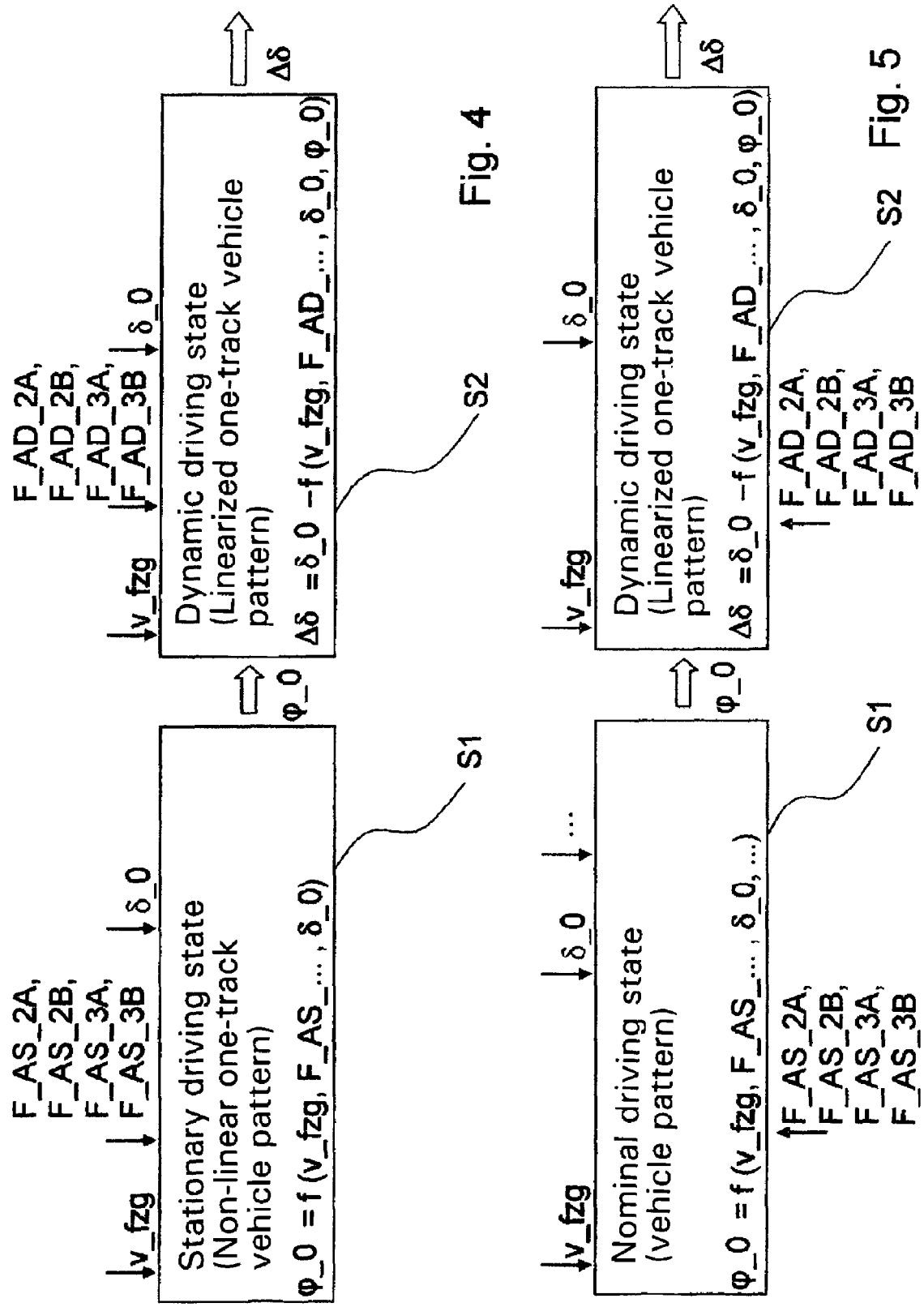

METHOD FOR DETERMINING A CONTROL STANDARD OF AN ACTIVE VEHICLE STEERING DEVICE CONTROLLABLE BY A CONTROL DEVICE

This application claims priority from German Application Serial No. 10 2005 004 523.5 filed Jan. 31, 2005.

FIELD OF THE INVENTION

The invention concerns a method for determining a control standard of an active vehicle steering device controllable by a control device.

BACKGROUND OF THE INVENTION

Driving dynamics fundamentally represents a branch of technological dynamics, that is, of the vehicle mechanics, which deals with the forces acting upon a vehicle and the vehicle motions, in turn, resulting therefrom. Driving dynamics is divided in longitudinal dynamics, transverse dynamics and vertical dynamics of a vehicle.

Longitudinal dynamics concerns itself with the interaction of driving or braking forces on the wheels and with the tractional resistances dependent on the route and operating conditions. From the longitudinal dynamics, important conclusions can thus be drawn for the fuel consumption, the acceleration capacity and the design of the drive line and brake system.

Transverse dynamics examines the forces, such as crosswind or centrifugal forces, which deviate the vehicle from the driving direction. The forces can be compensated only by lateral guiding forces of the tires or wheels, the rubber-coated wheel following, compared to its central plane under a corresponding diagonal transit angle. The dynamic wheel load, the driving and braking forces, the same as the frictional nature of the road, are also influential. Depending on the position of the center of gravity, on the striking point of the wind forces, on the construction of the wheel suspension and on the tire quality, driving properties result which, together with the driver's steering reactions to the driving behavior, allow conclusions as to maintaining the driving direction when driving straight ahead and driving stability when cornering.

Vertical dynamics analyzes the vertical forces and motions produced by unevenness of the road and by interposition of tire and truck suspension produce around the transverse axle striking vibrations and pitch vibrations which are reduced by way of vibration dampers. Around the longitudinal axle, a rolling, dependent on the axle arrangement results, which can be influenced by stabilizers when cornering.

It is sought to improve the driving dynamics by using electronic control systems it is possible to influence the longitudinal dynamics, for example by an antiblock system, the transverse dynamics by a driving dynamics control with purposeful influencing of the yawing torques by a brake engagement and the vertical dynamics by a reduction of the tendency to roll of the vehicle construction and influencing of the damping properties by electronic running gear control.

Distinction is further made between an undercontrolled and an overcontrolled vehicle, the same as a vehicle distinguished by a neutral driving behavior. A diagonal transit angle of the front wheels in an undercontrolled vehicle is larger than the diagonal transit angle of the rear wheels. This means that an undercontrolled vehicle must strive to travel a larger radius of curve than that corresponding to the driven front wheels and, at the same time, pushed outwardly via the front wheels.

In an overcontrolled vehicle, the diagonal transit angles of the rear wheels are larger than those of the front wheels and, in such an operating state, the driving behavior of the vehicle is distinguished by the vehicle striving for a smaller radius of curve than that corresponding to the driven front wheels and, in extreme situations, finally breaking away with the rear.

Contrary to this, the diagonal transit angles of the front and rear wheels of a vehicle are of the same size in a neutral driving behavior and, in extreme situations, the vehicle strives and drifts evenly and uniformly over all wheels.

Taking into consideration the above stated information, the forces acting on the vehicle during its operation and the operating state curves of a vehicle resulting therefrom can be reproduced at least approximately by way of mathematical algorithms and theoretical vehicle patterns constructed thereon in a manner such that a behavior of the vehicle in different driving situations can be theoretically represented.

Testing methods known in the practice are further used in real vehicles where the effects of a load change on the maintenance of direction and on direction behavior of a vehicle are determined. During a stationary circular motion of the vehicle, the driver deals with a disturbance or occurrence that changes the tire forces in the form of a predefined load change so as to be able to observe the vehicle and evaluate reactions on the real system after sudden load changes like gas withdrawal, gas supply or braking during a stationary cornering.

During a circular motion, if a load change is initiated by gas withdrawal or braking, there results an axle load misalignment of the rear axle upon the front axle such that the dynamic tire tread forces on the front axle become stronger while the dynamic tire tread forces on the rear axle become accordingly weaker. As a result of this axle misalignment, the lateral force potential of the wheels on the front axle become stronger corresponding to the tire behavior, and the lateral force potential of the wheels on the rear axle become weaker so that the lateral force distribution changes. The input forces on the front axle additionally produce a yawing torque during an all-wheel or front-wheel drive. As a rule, a vehicle shifts when cornering and during an acceleration phase, that is, a traction operation out of the curve and into the curve during gas withdrawal, that is, a coasting operation.

The sudden and unexpected changes of the inherent steering behavior due to changes of the tire longitudinal forces caused, for example, by a load change, are not foreseeable for the normal driver and especially hard to control in extreme situations. In normal street traffic, cornerings take place with hard to control load change reactions and a change resulting therefrom of the inherent steering behavior when passing through entrances and exits of expressways which, especially for inexperienced drivers, can lead to driving situations critical to safety under certain circumstances.

In general, all drive train influences, which act upon the vehicle and result, for example, from longitudinal forces acting on the vehicle when cornering in traction or coasting operation, the same as in case of load changes of a vehicle, change the inherent behavior of a vehicle since when cornering they change the lateral force distribution compared to a rolling operation of the vehicle free of longitudinal force when cornering.

DE 197 23 358 A1 discloses a motor-operated steering system in which, on one hand, the driver's steering movement is assisted by the motor and, on the other hand, the driving stability and driving comfort of the vehicle are increased by the fact that as a result of added steering motions performed by the motor yawing motions of the vehicle are minimized. The motions of the vehicle are, at the same time, detected by different sensors and serve as measure for added steering motions performed by the motor.

This system, however, disadvantageously has long reaction periods, since only after detection of the vehicle motions, do the steering motions to be performed by the motor generate whereby driving situations critical to safety can be prevented only to a very limited extent.

Therefore, the problem on which this invention is based is to make a method available of which the driving dynamics of a vehicle can be easily controlled with brief reaction periods so that it is possible to effectively cope with driving conditions critical to safety.

SUMMARY OF THE INVENTION

With the inventive method for determining a control standard for an active steering device of a vehicle controllable by a control device, the driving dynamics of a vehicle can be easily changed in direction of a predefined driving dynamics of the vehicle dependent on operating state by the brief reaction periods required for successfully preventing driving situations critical to safety or with the brief reaction periods required for effectively coping with driving situations critical to safety, taking into account an actual operating state of the vehicle.

Furthermore, a controlled vehicle can be produced with a driving behavior desired or predefined in a manner corresponding to the specifications of a vehicle manufacturer according to the inventive method.

This is achieved by the control standard being determined according to a nominal yawing rate calculated at least with reference to different actual operating state parameters of the vehicle and to a dynamic vehicle state determined according to the nominal yawing rate, the same as actual operating state parameters of the vehicle and an actual yawing rate corresponding therewith, the control standard being superimposed on a steering transit angle preset by a driver in a manner such that an existing actual yawing rate is changed in direction of the nominal yawing rate.

The object of the invention is short reaction or control periods of which is to be obtained by the inventive procedure embodied as a pre-control method. Condition for this is an adequately exact definition of the control standard by way of the calculation algorithms basis of the inventive method and theoretical reproductions of the real vehicle system which, in turn, cause lower computer expense. A steering transit angle actually requested by the driver can thus be continuously or permanently, and in real time, adapted by an active steering device or of a superimposed steering system, depending on traction or coasting influences, so that an existing actual yawing rate, which diverges from a nominal yawing rate as result of longitudinal forces or drive train, influences acting on the vehicle during cornering is purposefully influenced and, for example, even constantly kept, depending on basic operating strategy.

In an advantageous development of the object of the invention, nominal yawing rate is determined according to the steering transit angle preset by a driver, static wheel tread forces and the actual vehicle speed. The nominal yawing rate is thus determined without the longitudinal forces which affect the driving dynamics of the vehicle and act on the vehicle so that the established yawing rate of the vehicle basically corresponds to a "neutral" driving behavior specific to the vehicle in which preferably no driving situations appear critical to safety.

Following the definition of the nominal yawing rate is the definition of the dynamic vehicle state and of the actual yawing rate corresponding thereto which, in a development of the inventive method, are determined according to the dynamic wheel tread forces, the definition advantageously resulting with the output of the control standard, in turn, determined from the nominal yawing rate and from the dynamic vehicle state, in that the existing actual yawing rate is changed in direction of the previously determined nominal yawing rate and corresponding to a neutral or predefined driving behavior.

BRIEF DESCRIPTION OF THE DRAWINGS

The invention will now be described, by way of example, with reference to the accompanying drawings in which:

FIG. 4 is an extremely simplified block gearshift pattern of a first alternative of the inventive method;

FIG. 5 is an extensively simplified block gearshift pattern of a second alternative of the inventive method;

DETAILED DESCRIPTION OF THE INVENTION

Figure 1:
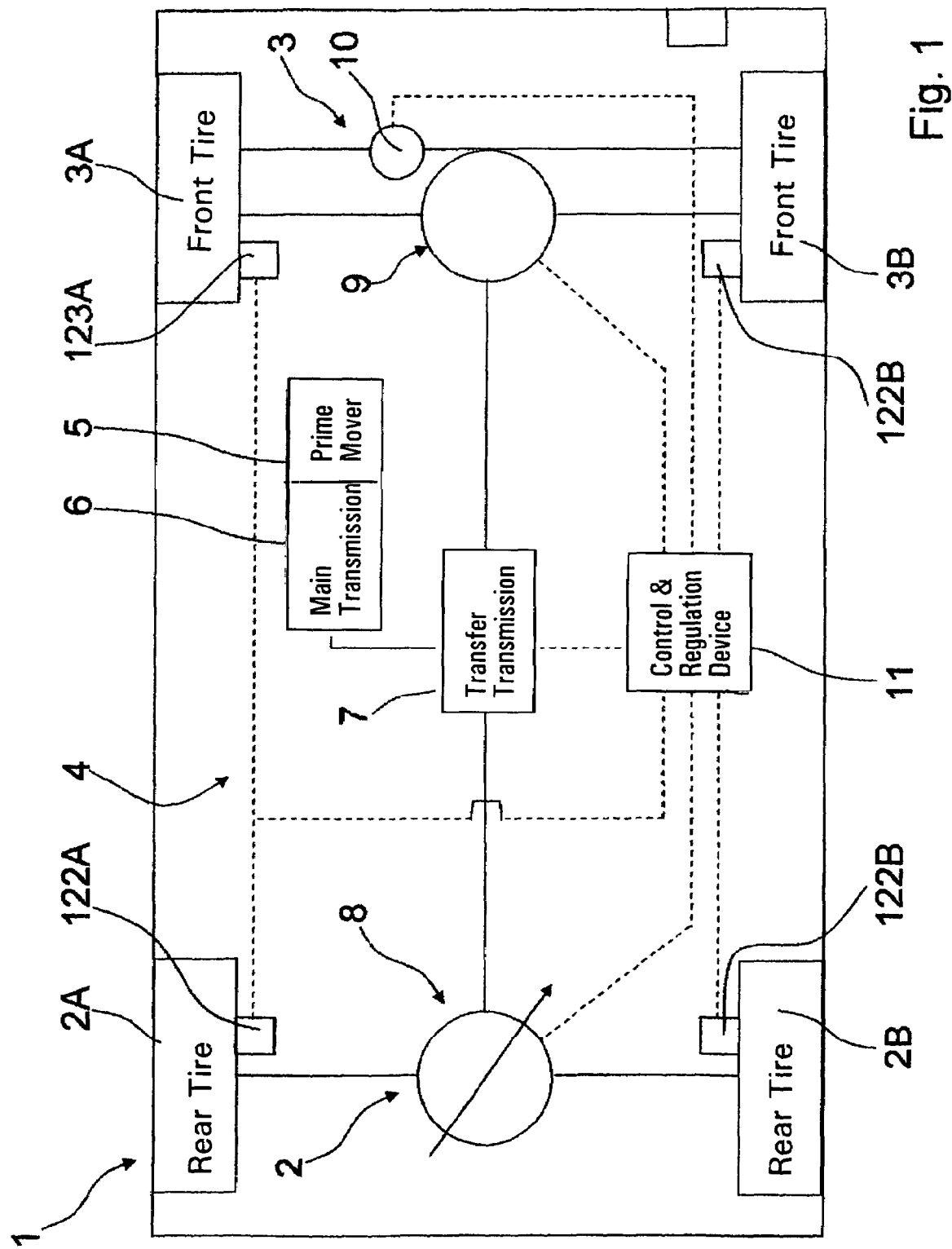
FIG. 1 is an extensively schematized graph of a vehicle with two drivable axles and on active steering device.

FIG. 1 shows an extensively schematized vehicle 1 designed as an all-wheel vehicle having two drivable axles 2, 3 which are part of a drive train 4 of the vehicle 1. In addition, the drive train 4 comprises one prime mover or an internal combustion engine 5 and one main transmission 6 which can be any transmission known from the practice.

Between the main transmission 6, which is provided to represent different ratios for forward and reverse gears, and the two drivable axles 2, 3 of the vehicle 1 which, in a known manner, are connected upon each vehicle side with at least one drive wheel 2A, 2B or 3A, 3B. One transfer transmission 7 is situated for distributing an input torque of the prime mover 5 or of the output torque of the main transmission 6 between the two drivable axles 2 and 3.

Between the drive wheels and the tires 2A, 2B and 3A, 3B respective device 8, 9 are additionally provided to compensate differential rotational speeds between the tires 2A, 2B of the vehicle axle 2 and the tires 3A, 3B of the vehicle axle 3, said devices 8, 9 being designed as a transverse transfer transmission or as axle transmission known per se. The axle transmission 9 of the vehicle axle 2, which here represents the vehicle rear axle, is designed with a controllable and regulatable lock. The portion of the output torque of the main transmission 6 supplied to the respective drivable axles 2 and 3 is thus relayed via the device 8, 9, respectively, to the drive wheels 2A, 2B and 3A, 3B of the axles 2, 3 and distributed, as needed, between the tires 2A, 2B and 3A, 3B of the concerned axle 2 or 3.

Both transverse transfer transmissions or axle transmissions 8 and 9 offer the possibility of driving the drive wheels of the axles 2 and 3 independently of each other at different rotational speeds according to the different path lengths of the left and right tracks whereby the drive torque can be symmetrically distributed and thus free of yawing torque between two drive wheels of a vehicle axle 2 or 3.

In addition, the front axle of the vehicle is designed with an active steering device 10, known from the practice, in which on one steering transit angle preset by a driver of the vehicle 1 can be superimposed in a known manner by way of a transmission a transit angle produced by a control device 11 and generated by a motor. The active steering device can be designed, for example, as a superimposed steering system or as one steer-by-wire steering system.

The vehicle 1 is further designed in the area of the wheels 2A, 2B or 3A, 3B with so-called CDC (Continuous Damping Control) dampers 122A, 122B, 123A, 123B, of which an electronic continuous damping control can be carried out in a known manner. Besides, according to different state parameters of the CDC dampers 122A, 122B, 123A, 123B which depend on an actual weight of the vehicle, static tire tread forces $F\_AS\_2A$, $F\_AS\_2B$, $F\_AS\_3A$, $F\_AS\_3B$, which act in normal direction upon the tires 2A to 3B, illustrated in detail in FIG. 2A, can be calculated in the control device 11 without taking into account dynamic influences.

The CDC dampers 122A, 122B, 123A, 123B are conventionally designed with acceleration sensors positioned over the tires 2A, 2B, 3A, 3B (not shown in detail) for sensorially determining the wheel accelerations in the operation of the vehicle 1. The so-called dynamic wheel tread forces $F\_AD\_2A$, $F\_AD\_2B$, $F\_AD\_3A$, $F\_AD\_3B$ of the tires 2A to 3B can be determined with the aid of sensor values. By the expression "dynamic wheel tread forces" is to be understood here of the resulting force components $F\_AD\_2A$, $F\_AD\_2B$, $F\_AD\_3A$, $F\_AD\_3B$ plotted in FIG. 2A as normal forces which are composed of the static tire tread forces $F\_AS\_2A$, $F\_AS\_2B$, $F\_AS\_3A$, $F\_AS\_3B$ and the dynamic force components acting in the area of the respective tires 2A to 3B depending on the actual operating state of the vehicle.

An alternative to the last mentioned definition, it is obviously at the expert's discretion to determine the dynamic wheel tread forces according to the operating state parameters of the vehicle, which are determined via vehicle components known for a long time in the practice, such as a level regulation device or active shock-absorbing devices. But, in addition, it is also possible to determine the dynamic wheel tread forces depending both on values of the acceleration sensors and on the above mentioned added operating state parameters.

At the same time, it is possible to assess the dynamic wheel tread forces with the aid of operating state parameters of the vehicle determined via the most different sensor devices disposed in the vehicle, such as the transmission output torque or a vehicle acceleration, depending on the previously determined static wheel tread forces. Diverging from this, however, it is also directly possible to determine the dynamic tire tread forces by way of an adequately developed tire-force sensor device.

Figures 2A, 2B, 2C, 2D, 2E:
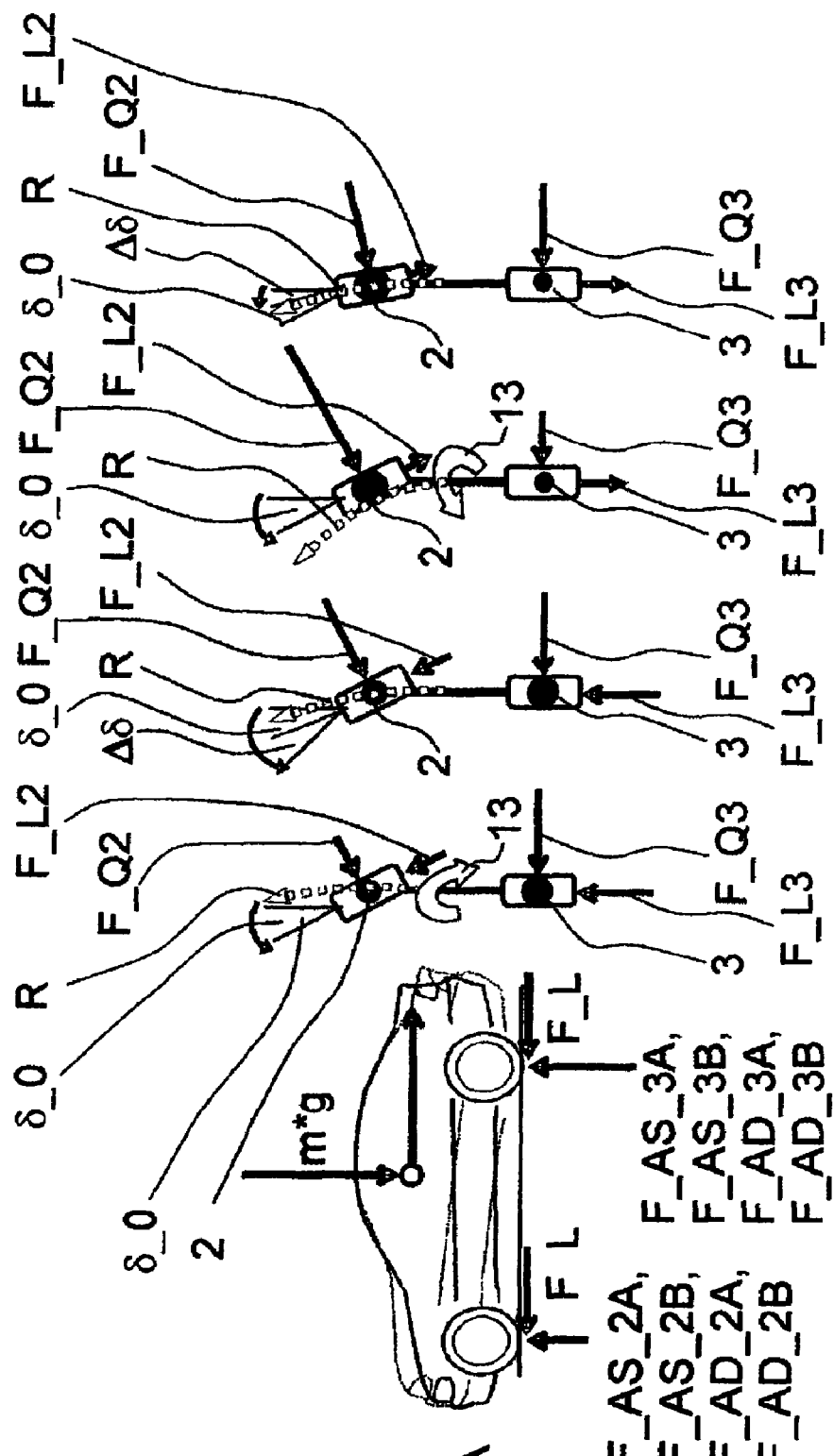
FIG. 2A is an extensively schematized side view of a vehicle.
FIG. 2B is a vehicle reproduced via one-track vehicle pattern during a traction operation and operated in a known manner.
FIG. 2C is a graph corresponding to FIG. 2B of a vehicle in traction operation which is controlled according to the invention.
FIG. 2D is a graph corresponding to FIG. 2B of a conventionally operated vehicle in coasting operation.
FIG. 2E is a graph corresponding to FIG. 2B of a vehicle controlled according to the invention in coasting operation.

In FIG. 2A is shown the vehicle 1 of FIG. 1 in an extensively schematized side view, said vehicle 1 being fundamentally shown in two different positions. The first position is reproduced by a solid line design and the second position graphically by a dotted line design. The vehicle 1 assumes here the first position during circular motion with constant steering transit angle in rolling state without longitudinal forces acting in the area of the tires and corresponds here to an initial position of the vehicle 1. The vehicle 1 assumes the second position in the traction operation which causes a so-called pitching of the vehicle around its transverse axle.

In FIG. 2B, the vehicle according to FIG. 2A is shown in an extensively schematized top view, wherein the tires 2A of the vehicle axle 2 and the tires 3A of the vehicle axle 3, the same as the tires 2B of the vehicle axle 2 and the tires 3B of the vehicle axle 3, respectively, forming one track on each vehicle axle, are shown combined to form a single track.

The vehicle shown in FIG. 2B is in traction operation when cornering is conventionally controlled. A yawing torque acting around the high axle of the vehicle 1 engages on the vehicle as graphically reproduced in FIG. 2B by the bent arrow 13 positioned between both schematically shown vehicle axles 2 and 3 and, in this case, resulting in an undercontrolled vehicle behavior.

There are further reproduced the tire longitudinal and transverse forces $F\_L2$, $F\_L3$ or $F\_Q2$, $F\_Q3$ acting in longitudinal direction of the vehicle or in transverse direction of the vehicle in the area of the axles 2, 3 or of the tires 2A, 2B or 3A, 3B combined to form one track and which perpendicularly to the static and the dynamic tire tread forces $F\_AS\_2A$, $F\_AS\_2B$, $F\_AS\_3A$, $F\_AS\_3B$, $F\_AD\_2A$, $F\_AD\_2B$, $F\_AD\_3A$, $F\_AD\_3B$ act upon the soil and engage the tires 2A to 3B.

In FIG. 2C, the vehicle 1 is shown in a graph corresponding to FIG. 2B in the operating state basis of FIG. 2B, one transit angle $\Delta\delta$ is superimposed on the steering transit angle $\delta$, shown in FIG. 2B, determined via the inventive method described below so that the yawing torque acting around the vehicle high axle is fully neutralized. The tire transverse forces $F\_Q2$, $F\_Q3$, shown in FIG. 2C, are changed compared to those shown in FIG. 2B, which is graphically reproduced by the different lengths of the arrows symbolizing the tire forces $F\_Q2$, $F\_Q3$. The superimposition of the determined steering transit angle $\Delta\delta$ on the steering transmit angle $\delta\_0$ requested by the driver of the vehicle 1, in addition, produces a change of the radius of curve R traversed by the vehicle 1 when cornering.

In FIG. 2D and FIG. 2E, according to FIG. 2A, the vehicle 1 is shown in a graph corresponding to FIG. 2B, the vehicle 1 being at the moment in coasting operation. The vehicle shown in FIG. 2D, the same as the one shown in FIG. 2B, is operated in a known manner. On the vehicle 1, shown as pattern in FIG. 2D, engages a yawing torque acting in direction opposite to the yawing torque engaging on the vehicle 1 in FIG. 2B which, in this case, results in an overcontrolled behavior of the vehicle 1.

In FIG. 2E, the track of the vehicle front axle 2 is deviated, compared to the graph according to FIG. 2D, by a small steering transit angle contrary to a position corresponding to a straight ahead travel whereby the yawing torque acting on the vehicle axle and producing an overcontrolled vehicle behavior is substantially neutralized.

The neutralization of the yawing torque, shown in FIG. 2D, like the neutralization of the yawing torque, described in FIG. 2B and FIG. 2C, results from the superimposition of a steering transmit angle $\Delta\delta$ determined via the inventive method described below on the steering transit angle $\delta\_0$ requested by the driver, the superimposition, in turn, producing a change of the tire forces $F\_L2$, $F\_L3$ or $F\_Q2$, $F\_Q3$ in the manner shown in FIG. 2D and FIG. 2E.

Figure 3:
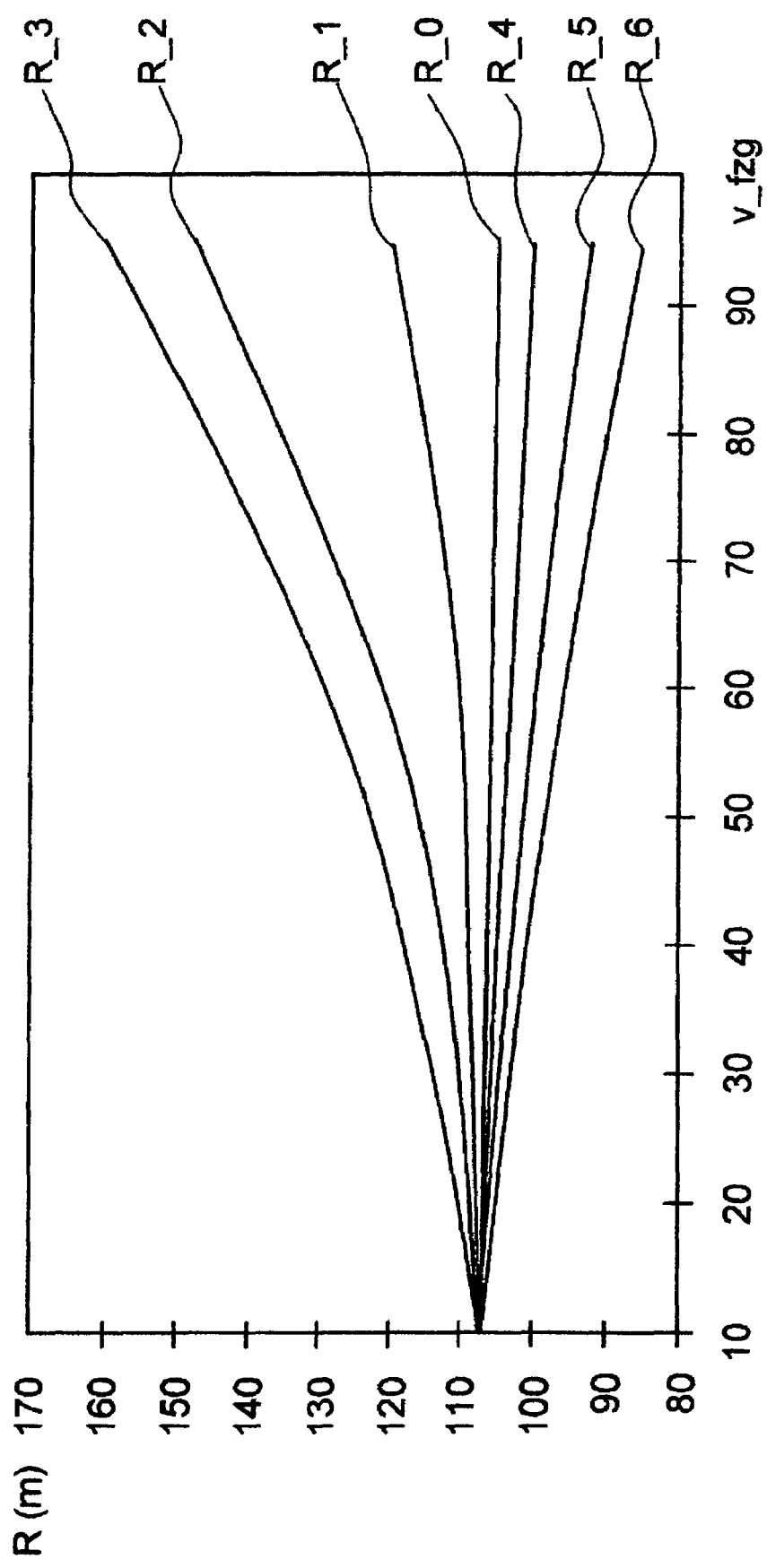
FIG. 3 is a graph of the influence of longitudinal forces acting on a vehicle plotted on a radius of curve via the vehicle speed.

The influence of the tire longitudinal forces $F\_L2$, $F\_L3$ acting in longitudinal direction on the vehicle 1 upon the radius of curve actually traversed when cornering is shown in FIG. 3 via the vehicle speed v_fzg. The line R_0 reproduces the radius of curve traversed with increasing vehicle speed v_fzg, a vehicle having such a behavior when the acting longitudinal forces are essentially zero.

The lines R_1, R_2 and R_3 extending above the line R_0 reproduce a driving behavior of a vehicle in traction operation. The deviations of the lines R_1 to R_3 from the line R_0 increase as the vehicle speed v_fzg rises, the line R_3 having the greatest deviations. This results from the fact that the tire longitudinal forces underlying the line R_3 are stronger than the tire longitudinal forces underlying the lines R_1 and R_2.

The lines R_4, R_5 and R_6 extending beneath the line R_0 represent the momentary driving behavior of a vehicle in coasting operation, the weakest tire longitudinal forces underlying the line R_4 and the strongest tire longitudinal forces underlying the line R_6.

Changes in longitudinal force, that is, accelerations acting on the vehicle, basically cause changes in the area of the dynamic wheel tread forces F_AD_2A, F_AD_2B, F_AD_3A, F_AD_3B. Therefore, also results when cornering a change of the lateral distribution of force in the area of the tires 2A to 3B. In addition, the driving forces in all-wheel or front drive produce a yawing torque on the vehicle front axle so that, as a rule, the vehicle turns off the curve when cornering during an acceleration phase of the vehicle, and when gas is withdrawn cuts into the curve.

Figure 6:
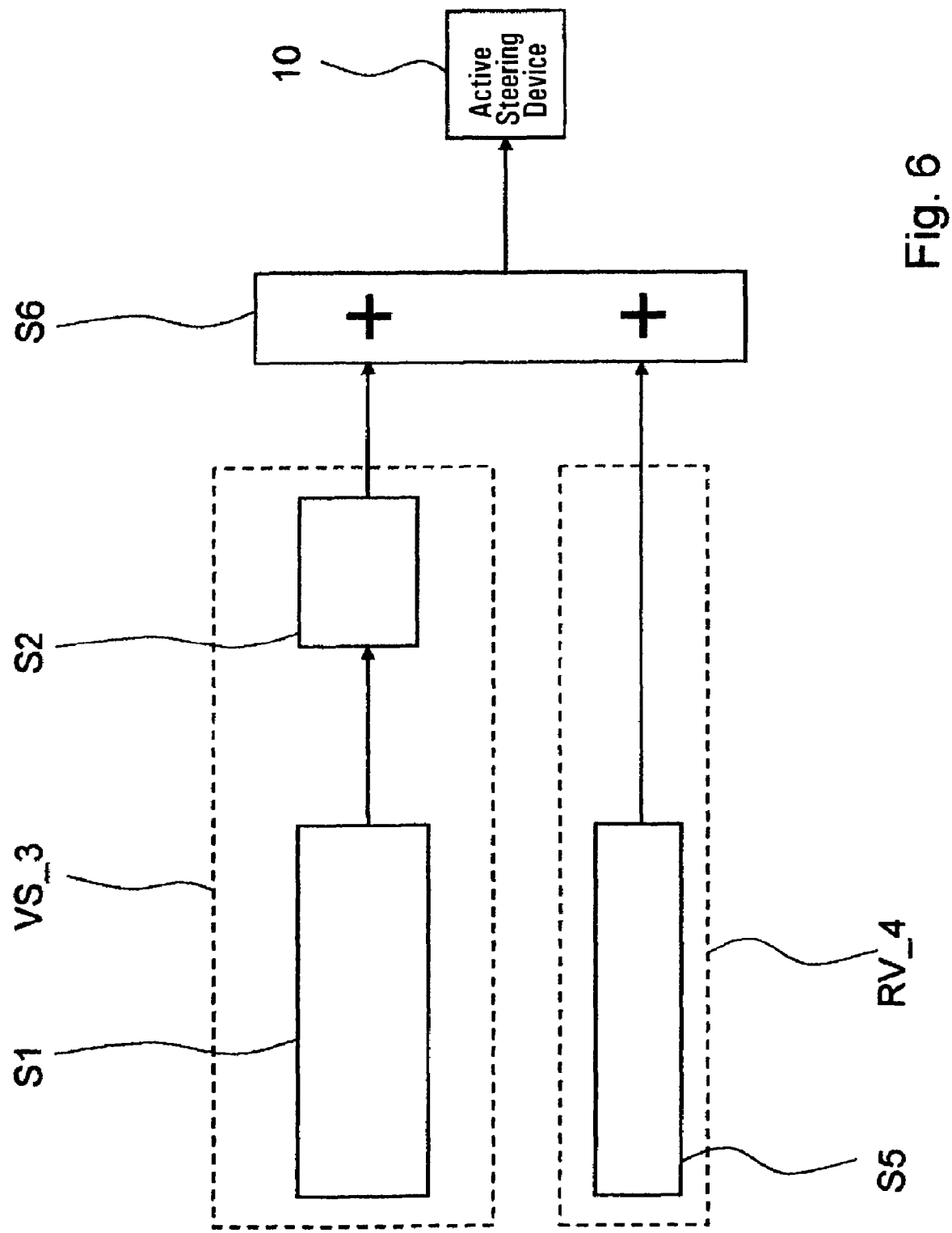
FIG. 6 is a flow chart of a third alternative of the inventive method.

By way of the different alternatives of the inventive method described in FIG. 4, FIG. 5 and FIG. 6, the influences of the drive train, due to changes in longitudinal forces and which appear on the inherent steering behavior of a vehicle when cornering, must be continuously calculated and neutralized in the field of physics or be suitably compensated according to a predefined operating strategy.

For the purpose, in the first alternative of the inventive method shown in FIG. 4 in the form of an extensively schematized flow chart, a stationary driving state or a nominal yawing rate $\phi\_0$ is first determined during a step F_1. The vehicle 1 is reproduced theoretically or as pattern by way of a non-linear one-track pattern. At the same time, both wheels 2A, 3A or 2B, 3B of the vehicle axles 2 and 3 are combined in the area of the vehicle front axle 2 and of the vehicle rear axle 3 to form a single track in the manner described above in relation to FIG. 2B in order to simplify the calculation and the behavior of the vehicle 1 is mathematically reproduced with the aid of a function of higher order. I is also possible to determine the nominal yawing rate depending on the application case via a linearized one-track vehicle pattern.

In the calculation of step S1 entered as input computer parameters, the actual vehicle speed v_fzg, the static tire tread forces F_AS_2A, F_AS_2B, F_AS_3A, F_AS_3B, the same as a steering transit angle $\delta\_0$ actually requested by a driver of the vehicle 1, in order theoretically to determine or calculate the nominal yawing rate $\phi\_0$. The nominal yawing rate $\phi\_0$ determined during the step S_1 thus corresponds to a yawing rate of the vehicle on which in essence no longitudinal forces act so that the nominal yawing rate $\phi\_0$ substantially corresponds to a vehicle with neutral driving behavior.

Subsequently in a step S_2, a dynamic driving state is determined with the aid of a one-track vehicle pattern that theoretically reproduces the real vehicle, which is linearized at the operating point actual basis of the calculation and at which, likewise, both tracks of the vehicle 1 are theoretically assumed as one track.

In the calculation of the dynamic vehicle state enter the vehicle speed v_fzg, the dynamic tire tread forces F_AD_2A, F_AD_2B, F_AD_3A, F_AD_3B of the steering transit angle $\delta\_0$ actually requested by the driver and nominal yawing rate $\phi\_0$ input determined in the step S_1, the superimposition of the steering transit angle $\Delta\delta$ representing the output parameter of the step S_2 and being then superimposed on the steering transit angle $\delta\_0$ requested by the driver.

The second alternative of the inventive method shown in FIG. 5 in the form of an extensively schematized flow chart differs essentially from the first alternative shown in FIG. 4 in the area of the step S_1 during which the nominal yawing rate $\phi\_0$ is additionally determined according to a predefined operating strategy preferably specified by the manufacturer of the vehicle. The operating strategy is presented in the form of predefined characteristic values which, during the calculation, are read out from a characteristic field stored in the control device 11. The characteristic values correspond to the actual operating state parameters at the calculation moment of the superimposed steering transmit angle $\Delta\delta$. That is, in this case, to the actual vehicle speed v_fzg, the static tire tread forces F_AS_2A, F_AS_2B, F_AS_3A, F_AS_3B, the same as the steering transmit angle $\delta\_0$ actually requested by the driver or actually adjusted.

It is thus possible in the second alternative, unlike in the first alternative of the inventive method, to determine the nominal yawing rate $\phi\_0$ in accordance with a desired vehicle behavior which, during operation of the vehicle, can be changed, for example, by changing driving programs. This means that it is possible, for example, on the driver's part or on the control part, generally to produce a rather undercontrolled, a rather overcontrolled or a neutral driving behavior.

FIG. 6 shows a flow chart of a third alternative of the inventive method in which a pre-control process VS_3 and a regulating process RV_4 comprising the steps S_1 and S_2 are engaged in parallel. The control standard for control of the active steering device 10 is thus determined in two parallel paths.

During the pre-control process VS_3 representative of the first path, one first portion of the control standard for control of the active steering device 10 is calculated either by way of the first alternative described in FIG. 4 or of the second alternative of the inventive method described in FIG. 5, during one other portion of the control standard, in a step S_5 of the regulating process RV_4 representative of the second path. The actual steering transit angle $\delta\_0$ is determined which, in a step S_2, is added to the superimposed steering transmit angle $\Delta\delta$ determined via the pre-control process VS_3 and then issued as control standard to the active steering device 10.

Figure 7:
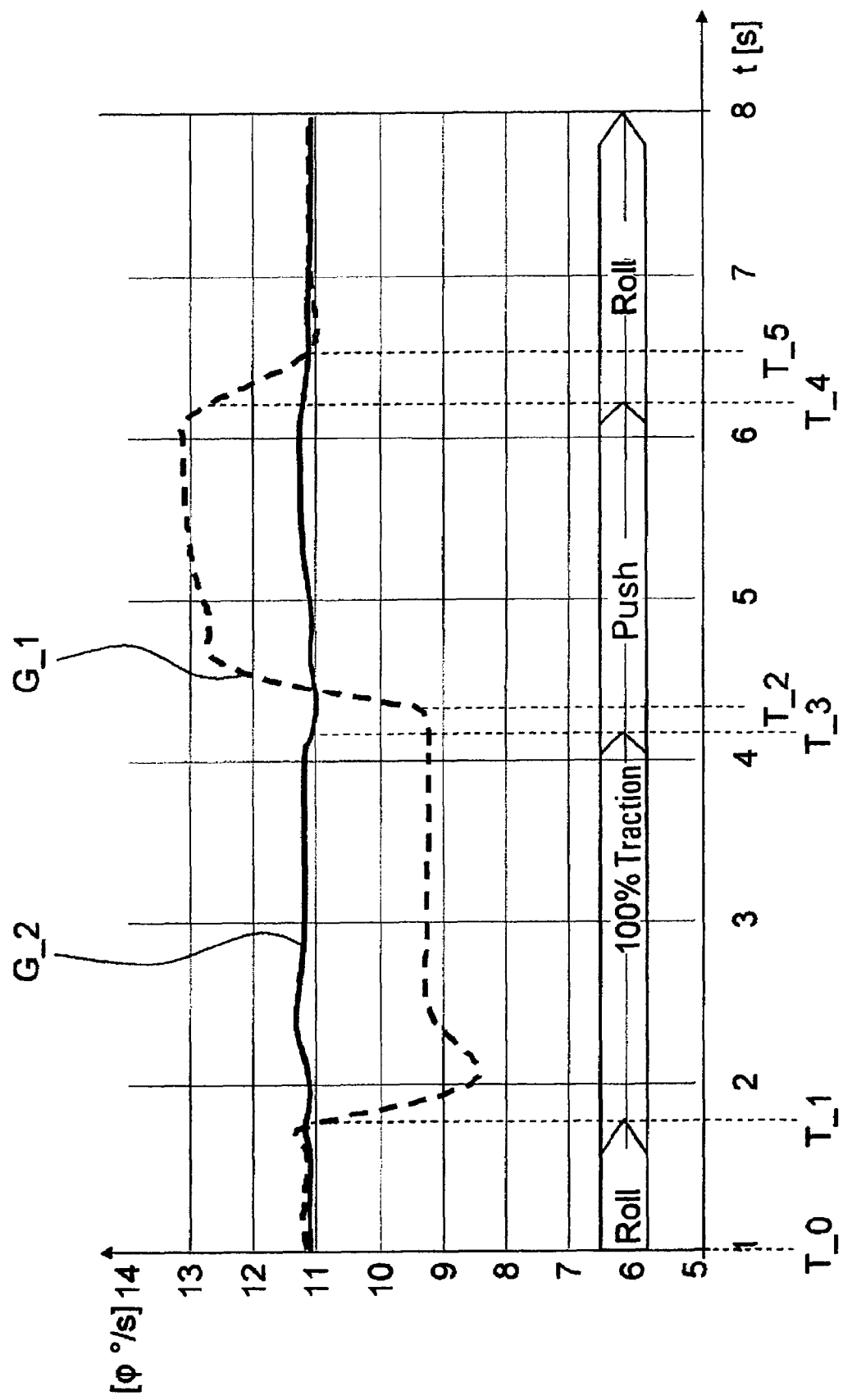
FIG. 7 is a comparison of curves between the yawing rate of a conventionally operated vehicle and an inventively operated vehicle during different operating states.

FIG. 7 shows a comparison of two curves G_1 and G_2 of a yawing rate of the vehicle 1 in the course of time t, which adapt to different consecutive operating states of the vehicle when cornering. The curve G_1 corresponds here to the curve of the yawing rate which sets in with a conventionally operated vehicle in which none of the vehicle components affecting the driving dynamics of a vehicle, that is, the active steering device 10 here, is controlled according to the invention.

The vehicle speed is constant throughout the driving maneuver, a change of the yawing rate of about 35% occurs, due to the driving forces acting on the vehicle in a conventionally driven vehicle, compared to a neutral vehicle operation whereas in a vehicle neutralized by driving influences, the influence of the driving forces on the yawing rate is almost zero.

Between the moment T_0 and the moment T_1, the vehicle 1 traverses a curve of constant radius without the longitudinal forces that affect the vehicle behavior acting, which corresponds to an easy rolling of the vehicle 1.

At the T_1 moment, the vehicle 1 suddenly passes to a traction operation produced by full gas supply. The passage to the traction operation results in a lowering of the curve G_1 down to a minimum, the yawing rate oscillating after some time to a substantially constant value and remaining at this value up to a moment T_2. At a moment T_3, the vehicle 1 changes from traction operation to coasting operation; the change in operating state being produced here by a sudden withdrawal of gas. At the moment T_2 following shortly to the moment T_3, the curve G_1 of the yawing rate of the conventionally operated vehicle 1 rises to a value above the yawing rate of the neutral vehicle behavior during the natural state and then proceeds in essence constantly up to a moment T_4. In addition, the vehicle, in turn, passes to a stationary rolling state without longitudinal forces acting on the vehicle. At the passage from the coasting operation to the stationary rolling operation, the curve G_1 of the yawing rate drops to the value corresponding to the moment T_1 and then proceeds substantially constant.

In comparison to that is shown the curve G_2 of the yawing rate which appears after the above described operating state changes or load changes under corresponding inventive control of the active steering device. The curve G_2 of the yawing rate is substantially almost constant over the whole time period shown so that an inherent steering behavior of the vehicle detectable for a driver of the vehicle 1 is substantially retained in a vehicle at least approximately neutralized by driving influences.

Diverging from the above described alternatives of the inventive method, it can also be provided in other embodiments that instead of a linearized one-track vehicle pattern limiting a computing complexity, a mathematical vehicle is used for reproducing the real vehicle system pattern characterized by higher computer expenditure. It is thus possible, for example, to use a full vehicle pattern in which is theoretically reproduced a vehicle with two tracks or a non-linearized one-track vehicle pattern.

The inventive method obviously is not limited to be applied to an all-wheel vehicle shown in the drawings, but can basically be used in any vehicle equipped as desired which is designed with an active steering device.

Drive train effects occurring when cornering a vehicle due to an actual yawing rate momentarily depending on the operating state of a vehicle and to an actual transverse acceleration are known to result in a change of the inherent steering behavior of a vehicle. With the above described inventive method, the effects of the drive train influences on the inherent steering behavior are calculated and neutralized by the aid of the control standard or of an added wheel angle correlated therewith, or changed in direction of an inherent steering behavior dependent on operating strategy, that is, preferably in direction of an inherent behavior specifically predefined by the manufacturer of the vehicle.

The inventive method can further be used also in a vehicle designed with more than one steerable axle. The control standard can then be used, according to the application existing at the moment, only in the area of one of the steerable axles or simultaneously in the area of two or more steerable axles for adaptation of the actual yawing rate in direction of a nominal yawing rate by a change of the steering transit angle of the wheels of an axle or of the steering transit angles of the wheels of several axles.

REFERENCE NUMERALS 1 all-wheel vehicle
2 vehicle axle, rear axle
2A, 2B tires of the rear axle
3A, 3B tire of the front axle
3 vehicle axle
4 drive train
5 prime mover
6 main transmission
7 transfer transmission
8 axle transmission of the rear axle with lock
9 axle transmission of the front axle
10 active steering device
11 control and regulation device
122A, 122B
    CDC damper
123A, 123B
$\delta$ steering transit angle
R radius of curve
66 $\delta$ superimposed steering transit angle
F_AS_2A to
    static tire tread force
F_AS_3B
F_AD_2A to
    dynamic tire tread forces
F_AD_3B
F_L2, F_L3 tire longitudinal force
F_Q2, F_Q3 tire transverse force
R_1 to R_6 curve of the radius of curve
S_1, S_2
    step
S_5, S_2
VS_3 pre-control process
RV_4 regulation process
T_0 to T_5 moment
t time
v_fzg vehicle speed
$\phi\_0$ nominal yawing rate

The invention claimed is:

1. A method for controlling a yaw rate of a vehicle by determining a steering transit angle change for an active steering device (10) of the vehicle (1) controllable by a control device (11), the method comprising the steps of;
    influencing driving dynamics of the vehicle (1) including the yaw rate and steering transit angle change;
    determining the steering transit angle change by the steps of;
        calculating a nominal yawing rate ($\phi\_0$) according to an initial steering transit angle preset by a driver, static wheel tread forces, and an actual speed of the vehicle without determining longitudinal forces which affect the driving dynamics of the vehicle;
        determining a desired steering transit angle by applying the nominal yawing rate ($\phi\_0$) to a dynamic driving state of the vehicle determined according to the actual speed of the vehicle, a longitudinal dynamic wheel tread forces affecting the driving dynamics of the vehicle and the initial steering transit angle;
        subtracting the desired steering transit angle from the initial steering transit angle to obtain the steering transit angle change; and
    superimposing the steering transit angle change on the steering transit angle ($\delta\_0$) preset by the driver so that an actual yawing rate is reduced towards the nominal yawing rate ($\phi\_0$).

2. The method according to claim 1, further comprising the step of calculating the nominal yawing rate ($\phi\_0$) with a computer algorithm embodied as one-track vehicle pattern in which two tracks of a vehicle are by computation reproduced as one track.

3. The method according to claim 2, further comprising the step of designing the computer algorithm as one of a linearized or a non-linearized one-track vehicle.

4. The method according to claim 1, further comprising the step of calculating the nominal yawing rate ($\phi\_0$) with a computer algorithm designed as full vehicle pattern by way of which a vehicle having two tracks is theoretically reproduced.

5. The method according to claim 1, further comprising the step of storing an operating strategy as predefined characteristic values stored in a characteristic field which corresponding to the existing actual operating state parameters (v_fzg, F_AS_2A to F_AS_3B, $\delta\_0$) are each stored as input operands for the computer algorithms in the control device (11).

6. The method according to claim 1, further comprising the step of determining the dynamic driving state of the vehicle (1) according to the vehicle speed (v_fzg), dynamic wheel tread forces (F_AD_2A to F_AD_3B) and one steering transit angle ($\delta\_0$) requested by the driver.

7. The method according to claim 1, further comprising the step of determining the dynamic vehicle state by way of a linearized one-track vehicle pattern at the operating point actually basis of the calculation in which the two tracks of the vehicle are reproduced by computer as one track.

8. A method of controlling an active steering device of a motor vehicle to effect an actual vehicle yawing rate, the method comprising the steps of:
   determining a control factor for controlling the active steering device by the steps of;
      measuring a plurality of actual vehicle operating parameters resulting from a driver requested steering transit angle, and storing the plurality of actual vehicle operating parameters in a computer;
      calculating a nominal yawing rate of the vehicle as a function of the driver requested steering transit angle, static wheel tread forces, and an actual speed of the vehicle without measurement of any longitudinal forces which affect the driving dynamics of the vehicle;
      determining a desired steering transit angle in accordance with the nominal yawing rate, the driver requested steering transit angle, the actual speed of the vehicle and longitudinal dynamic wheel tread forces affecting the driving dynamics of the vehicle;
      deriving the control factor for controlling the active steering device in the dynamic vehicle operating state by determining a difference between the desired steering transit angle and the driver requested steering transit angle; and
   modifying the driver requested steering transit angle according to the determined control factor to adjust the actual yawing rate of the vehicle closer to the nominal yawing rate.

9. The method according to claim 8, further comprising the step of calculating the nominal yawing rate ($\phi\_0$) with a computer algorithm embodied as one-track vehicle pattern in which two tracks of a vehicle are by computation reproduced as one track.

10. The method according to claim 9, further comprising the step of designing the computer algorithm as one of a linearized or a non-linearized one-track vehicle.

11. The method according to claim 8, further comprising the step of calculating the nominal yawing rate ($\phi\_0$) with a computer algorithm designed as full vehicle pattern by way of which a vehicle having two tracks is theoretically reproduced.

12. The method according to claim 8, further comprising the step of storing the operating strategy as predefine characteristic values stored in a characteristic field which corresponding to the existing actual operating state parameters (v_fzg, F_AS_2A to F_AS_3B, $\delta\_0$) are each stored as input operands for the computer algorithms in the control device (11).

13. The method according to claim 8, further comprising the step of determing the dynamic driving state of the vehicle (1) according to the vehicle speed (v_fzg), dynamic wheel tread forces (F_AD_2A to F_AD_3B) and one steering transit angle ($\delta\_0$) requested by the driver.

14. The method according to claim 8, further comprising the step of determining the dynamic vehicle state by way of a linearized one-track vehicle pattern at the operating point actually basis of the calculation in which the two tracks of the vehicle are reproduced by computer as one track.

* * * * *